US011540439B2

(12) United States Patent
Gindt et al.

(10) Patent No.: US 11,540,439 B2
(45) Date of Patent: Jan. 3, 2023

(54) LAWN MOWER INCLUDING A CONTROL PANEL AND MOVABLE SEAT

(71) Applicant: Ariens Company, Brillion, WI (US)

(72) Inventors: Daniel J. Gindt, Appleton, WI (US); Andrew Donati, Appleton, WI (US); Christopher Forrest, Brillion, WI (US); Derek Mikula, Brillion, WI (US); Rebecca Vissers, Brillion, WI (US); Fredric D. Schreiner, Green Bay, WI (US); Scott Lyman, Brillion, WI (US); Matthew P. Schuller-Rach, Kaukauna, WI (US)

(73) Assignee: Ariens Company, Brillion, WI (US)

( * ) Notice: Subject to any disclaimer, the term of this patent is extended or adjusted under 35 U.S.C. 154(b) by 721 days.

(21) Appl. No.: 16/514,887

(22) Filed: Jul. 17, 2019

(65) Prior Publication Data
US 2020/0022303 A1    Jan. 23, 2020

Related U.S. Application Data

(60) Provisional application No. 62/700,136, filed on Jul. 18, 2018.

(51) Int. Cl.
*A01D 34/00* (2006.01)
*A01D 67/04* (2006.01)
(Continued)

(52) U.S. Cl.
CPC ........... *A01D 34/006* (2013.01); *A01D 67/04* (2013.01); *A01D 75/28* (2013.01); *B60N 2/38* (2013.01); *A01D 34/64* (2013.01); *A01D 2101/00* (2013.01)

(58) Field of Classification Search
CPC .. A01D 34/006; A01D 67/04; A01D 2101/00; B60N 2/38
See application file for complete search history.

(56) References Cited

U.S. PATENT DOCUMENTS

| 3,170,173 A | 2/1965 | Tourneau |
| 4,026,379 A | 5/1977 | Dunn et al. |
(Continued)

FOREIGN PATENT DOCUMENTS

| DE | 102009048630 A1 | 4/2011 |
| WO | 2007/118927 A1 | 10/2007 |

OTHER PUBLICATIONS

AGCO GmbH, Tractors Fendt 700 Vario, website: https://web.archive.org/web/20150910104206-http://www.fendt.com/int/9198.asp, Sep. 10, 2015, 11 pages.

*Primary Examiner* — Alicia Torres
(74) *Attorney, Agent, or Firm* — Michael Best & Friedrich LLP

(57) ABSTRACT

A lawn mower includes a seat plate movably coupled to the frame. An operator seat is coupled to the seat plate. An armrest is laterally spaced from the operator seat and includes an elongated support, an arm support surface, and a control panel. The elongated support has a first end fixed to the seat plate and a second end. The arm support surface is coupled to the second end and can support a user's arm. The control panel is positioned between the arm support surface and the second end of the elongated support. The control panel is fixed to the elongated support for movement with the seat plate such that the control panel remains stationary relative to the seat plate. The control panel includes an actuator to control a function of the lawn mower. The actuator is configured to be actuated while the user's arm is on the support surface.

16 Claims, 13 Drawing Sheets

(51) Int. Cl.
  *B60N 2/38*   (2006.01)
  *A01D 75/28*  (2006.01)
  *A01D 101/00*    (2006.01)
  *A01D 34/64*     (2006.01)

(56) References Cited

U.S. PATENT DOCUMENTS

| | | |
|---|---|---|
| 4,097,085 A | 6/1978 | Nelson |
| 5,409,079 A | 4/1995 | Strong et al. |
| 5,553,445 A | 9/1996 | Lamb et al. |
| 6,446,758 B1 | 9/2002 | Schatz |
| 6,588,188 B2 * | 7/2003 | Dennis ................ A01D 34/74 56/16.3 |
| 7,172,041 B2 * | 2/2007 | Wuertz ................ B62D 11/003 180/335 |
| 7,290,635 B2 | 11/2007 | Bisick et al. |
| 7,347,299 B2 | 3/2008 | Billger et al. |
| 7,484,587 B2 | 2/2009 | Portscheller et al. |
| 7,712,571 B2 * | 5/2010 | Proud ................ B60K 26/02 74/491 |
| 7,797,918 B2 | 9/2010 | Drake et al. |
| 8,006,796 B1 * | 8/2011 | Fontaine ................ B60K 1/00 180/242 |
| 8,388,262 B2 | 3/2013 | Klein et al. |
| 8,979,175 B2 | 3/2015 | Kim |
| 9,462,746 B1 * | 10/2016 | Gerhardson ........ A01D 34/006 |
| 9,840,826 B2 * | 12/2017 | Huber ................ B60K 37/06 |
| 2004/0011939 A1 * | 1/2004 | Hohnl ................ B60N 2/0732 248/424 |
| 2006/0229770 A1 | 10/2006 | Strong |
| 2007/0095040 A1 | 5/2007 | Berkley |
| 2010/0052356 A1 * | 3/2010 | Lewis, II ................ B60N 2/501 297/219.1 |
| 2017/0190270 A1 * | 7/2017 | Busboom ................ B60N 2/502 |
| 2017/0196164 A1 * | 7/2017 | Bryant ................ A01D 69/002 |
| 2021/0289700 A1 * | 9/2021 | Decker ................ A01D 34/006 |

* cited by examiner

US 11,540,439 B2

LAWN MOWER INCLUDING A CONTROL PANEL AND MOVABLE SEAT

CROSS-REFERENCE TO RELATED APPLICATIONS

This application claims the benefit of, prior-filed U.S. Provisional Patent Application No. 62/700,136, filed Jul. 18, 2018. The entire contents of this document is incorporated by reference herein.

BACKGROUND

The present invention relates to utility machines and, more particularly, to control panels for lawn mowers.

SUMMARY

In one embodiment, the invention provides a lawn mower including a frame, a prime mover supported by the frame, a plurality of ground engaging elements coupled to the frame and driven by the prime mover to propel the lawn mower, and a cutting deck pan supported by the frame. The lawn mower also includes a cutting blade mounted below the cutting deck pan to cut vegetation under the cutting deck pan, and a seat plate movably coupled to the frame. An operator seat is coupled to the seat plate and is configured to support the weight of an operator. An armrest is laterally spaced from the operator seat and includes an elongated support, an arm support surface, and a control panel. The elongated support has a first end fixed to the seat plate and a second end. The arm support surface is coupled to the second end of the elongated support and is configured to support a user's arm. The control panel is positioned between the arm support surface and the second end of the elongated support. The control panel is fixed to the elongated support for movement with the seat plate such that the control panel remains stationary relative to the seat plate. The control panel includes an actuator to control a function of the lawn mower. The actuator is configured to be actuated while the user's arm is on the support surface.

In another embodiment, the invention provides a utility machine including a frame having a front end and a rear end, a prime mover supported by the frame, first ground-engaging elements coupled to the frame adjacent the rear end and driven by the prime mover to propel the utility machine, second ground-engaging elements coupled to the frame adjacent the front end, and a cutting deck pan supported by the frame. The cutting deck pan defines a discharge opening disposed on a side of the cutting deck pan between the first ground-engaging elements and the second ground-engaging elements. The machine also includes a cutting blade mounted below the cutting deck pan to cut vegetation under the cutting deck pan, and a seat assembly. The seat assembly includes a seat plate moveably coupled to the frame and an operator seat coupled to the seat plate. The seat assembly also includes a first armrest and a second armrest. The first armrest is fixed relative to the seat plate and is disposed on a side of the seat plate opposite to the discharge opening. The second armrest is fixed relative to the seat plate and is disposed on a side of the seat plate proximate the discharge opening. The second armrest includes an arm support surface and a control plate supporting controls actuatable by a user. The control panel is fixed to the elongated support. The controls are positioned around the arm support surface.

In yet another embodiment, the invention provides utility machine including a frame, a prime mover supported by the frame, a plurality of ground-engaging elements coupled to the frame and driven by the prime mover to propel the lawn mower, and a cutting deck pan supported by the frame. The machine also includes a cutting blade mounted below the cutting deck pan to cut vegetation under the cutting deck pan, and a seat assembly. The seat assembly includes a seat plate moveably coupled to the frame and an operator seat coupled to the seat plate. The seat assembly also includes a first armrest fixed relative to the seat plate and a second armrest fixed relative to the seat plate. The second armrest includes an arm support surface and a control plate supporting controls actuatable by a user. The control plate is fixed relative to the elongated support. The controls are positioned around the arm support surface. The machine also includes a fuel tank that is disposed at least partially around the seat assembly and is spaced apart from the control plate of the second armrest.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
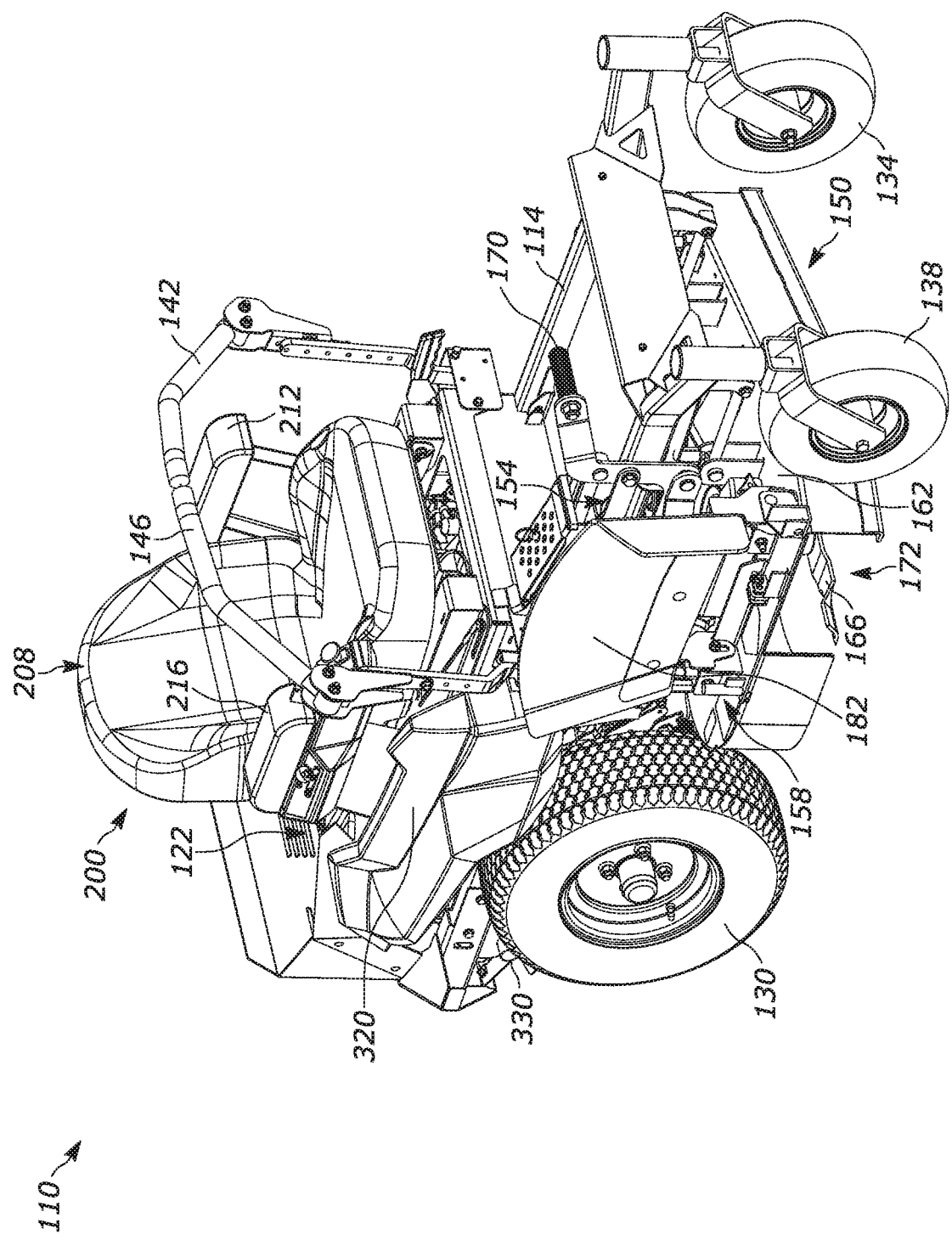
FIG. 1 is a perspective view of a lawn mower including a control panel assembly according to the present invention.
Figure 2:
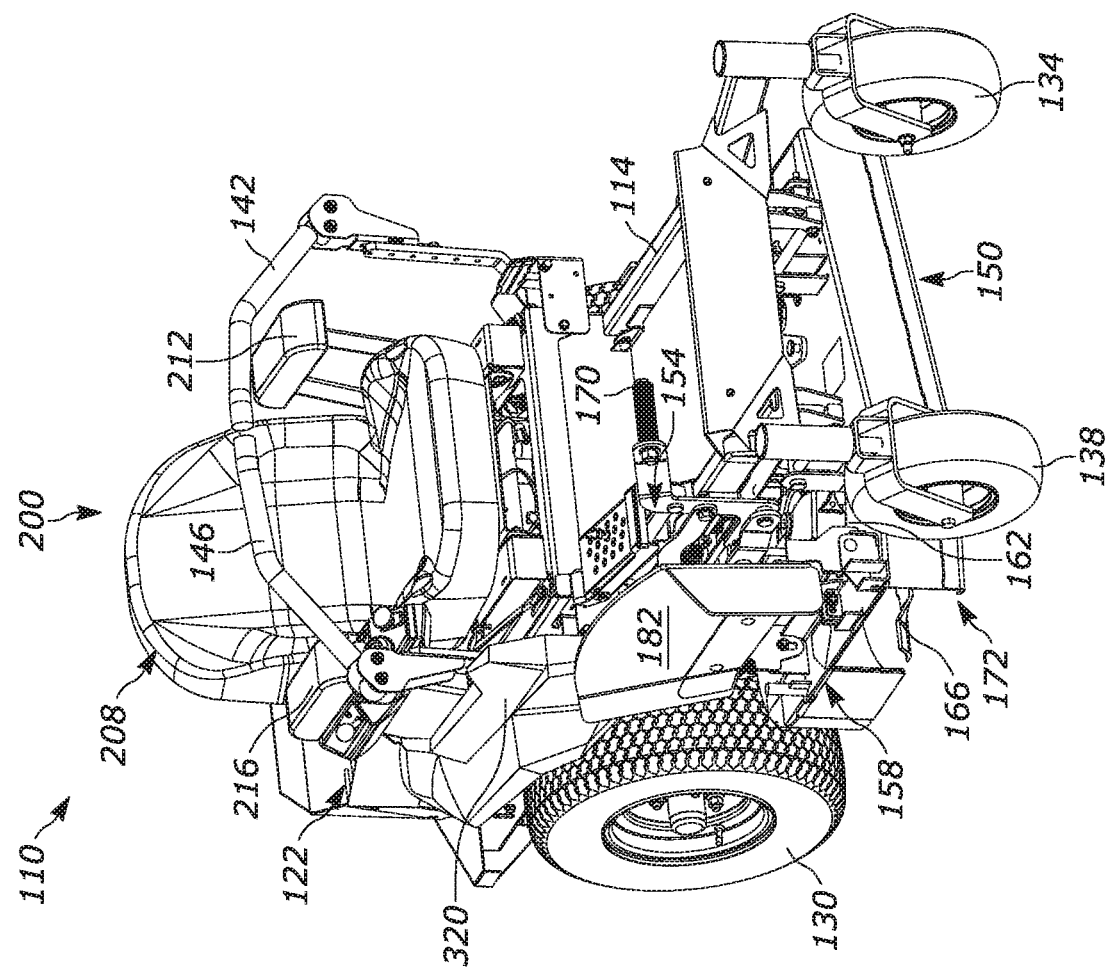
FIG. 2 is another perspective view of the lawn mower of FIG. 1 with a seat assembly of the lawn mower and the control panel in a forward position.

FIGS. 1 and 2 illustrate a lawn mower 110 including a frame 114, a seat assembly 200, a prime mover 122, left and right driven wheels 126, 130, left and right passive wheels 134, 138, left and right control arms 142, 146, a deck assembly 150, a deck lifting assembly 154, and a discharge chute assembly 158. The terms "front," "rear," "left," and "right" will be used in this specification from the perspective of an operator seated on the lawn mower 110 during ordinary operation.

The frame 114 is supported by the driven wheels 126, 130 and the passive wheels 134, 138 above the ground, and in turn supports the other components of the lawn mower 110. In some embodiments, the frame 114 may be supported above the ground by other types of ground-engaging elements, such as tracks, skis, and the like.

The prime mover 122 is supported by the frame 114 generally below the seat assembly 200. The prime mover 122 is coupled to and drives the other components of the lawn mower 110, such as the wheels 126, 130. In some embodiments, the prime mover 122 may be, for example, a gasoline powered internal combustion engine, but may alternatively be any other type of prime mover such as an electric motor, a hybrid gas/electric motor, a fuel cell, or any other suitable device operating on a suitable fuel.

The left and right driven wheels 126, 130 are rotatably coupled to the frame 114 behind the deck assembly 150 and interconnected with the prime mover 122. In some embodiments, the wheels 126, 130 are driven by the prime mover 122 through a power transmission and suitable hydraulic pumps and motors; although in other embodiments, the wheels 126, 130 may be driven with an electric motor. The hydraulic pumps and motors are manipulated with the left and right control arms 142, 146, with the left control arm 142 controlling the direction and speed of rotation of the left driven wheel 126, and the right control arm 146 controlling the direction and speed of rotation of the right driven wheel 130. The wheels 126, 130 propel the lawn mower 110 in a direction of travel (e.g., forward or reverse).

The left and right passive wheels 134, 138 are coupled to the frame 114 in front of the deck assembly 150. The passive wheels 134, 138 are not driven by the prime mover 122 (or any other motors), but are free to rotate relative to the frame 114. In the illustrated embodiment, the passive wheels 134, 138 are caster wheels.

The control arms 142, 146 are pivotally coupled to the frame 114 adjacent the seat assembly 200 and interconnected with the transmissions of the drive wheels 126, 130. The control arms 142, 146 are independently movable to control the drive speed and direction of the wheels 126, 130. The illustrated lawn mower 110 may be referred to as a zero-turn-radius lawn mower or ZTR lawn mower because when one of the control arms 142, 146 is pressed full forward and the other control arm 142, 146 is pulled full rearward, the lawn mower 110 will move in a very tight radius owing to one wheel rotating forward and the other rotating backwards. A ZTR lawn mower steers through the speed and direction difference of the two driven wheels 126, 130. In other embodiments, the lawn mower 110 may include other types of actuators for steering, such as joysticks, a steering wheel, and the like.

The deck assembly 150 includes a cutting deck pan 162 and multiple cutting blades 166 (only one is shown is FIGS. 1-2). The cutting deck pan 162 is supported under the frame 114 between the driven wheels 126, 130 and the passive wheels 134, 138. In other embodiments, the cutting deck pan 162 may be supported in front of the frame 114, behind the frame 114, or at other positions relative to the frame 114. The cutting blades 166 are mounted below the cutting deck pan 162 and are interconnected with the prime mover 122 (e.g., via a drive belt and sheaves). The prime mover 122 drives rotation of the cutting blades 166 to cut vegetation (e.g., grass) under the cutting deck pan 162.

The cutting deck pan 162 includes a discharge opening 172. The opening 172 defines a passageway from an area under the cutting deck pan 162 to an area outside of the cutting deck pan 162. A discharge chute 182 is movably coupled to the cutting deck pan 162 proximate the opening 172. The discharge chute 182 is rotatable between a raised position (FIG. 1) and a lowered position (not shown). In the lowered position, the discharge chute 182 assists in directing cut vegetation in a lateral direction through the opening 172 to the area outside of the cutting deck pan 162. Moving the discharge chute 182 to the raised position reduces a width of the lawn mower 110. This allows the lawn mower to fit into a smaller space and allows for more convenient transportation or storage of the lawn mower 110.

The deck lifting assembly 154 is coupled between the frame 114 and the cutting deck pan 162 to adjust a height (e.g., raise and lower) of the cutting deck pan 162 relative to the frame 114. In the illustrated embodiment, the deck lifting assembly 154 includes a foot pedal 170 in the operator zone, which is defined as the region accessible by an operator of the lawn mower 110 during ordinary operation. The foot pedal 170 is interconnected with the deck lifting assembly 154, such that pivotal movement of the foot pedal 170 (e.g., under the influence of the operator's leg and foot) actuates the deck lifting assembly 154 to raise and lower the cutting deck pan 162. In other embodiments, other types of deck lift actuators may be employed in place of or in addition to the foot pedal 170 to raise and lower the cutting deck pan 162, including a hand lever.

Figure 3:
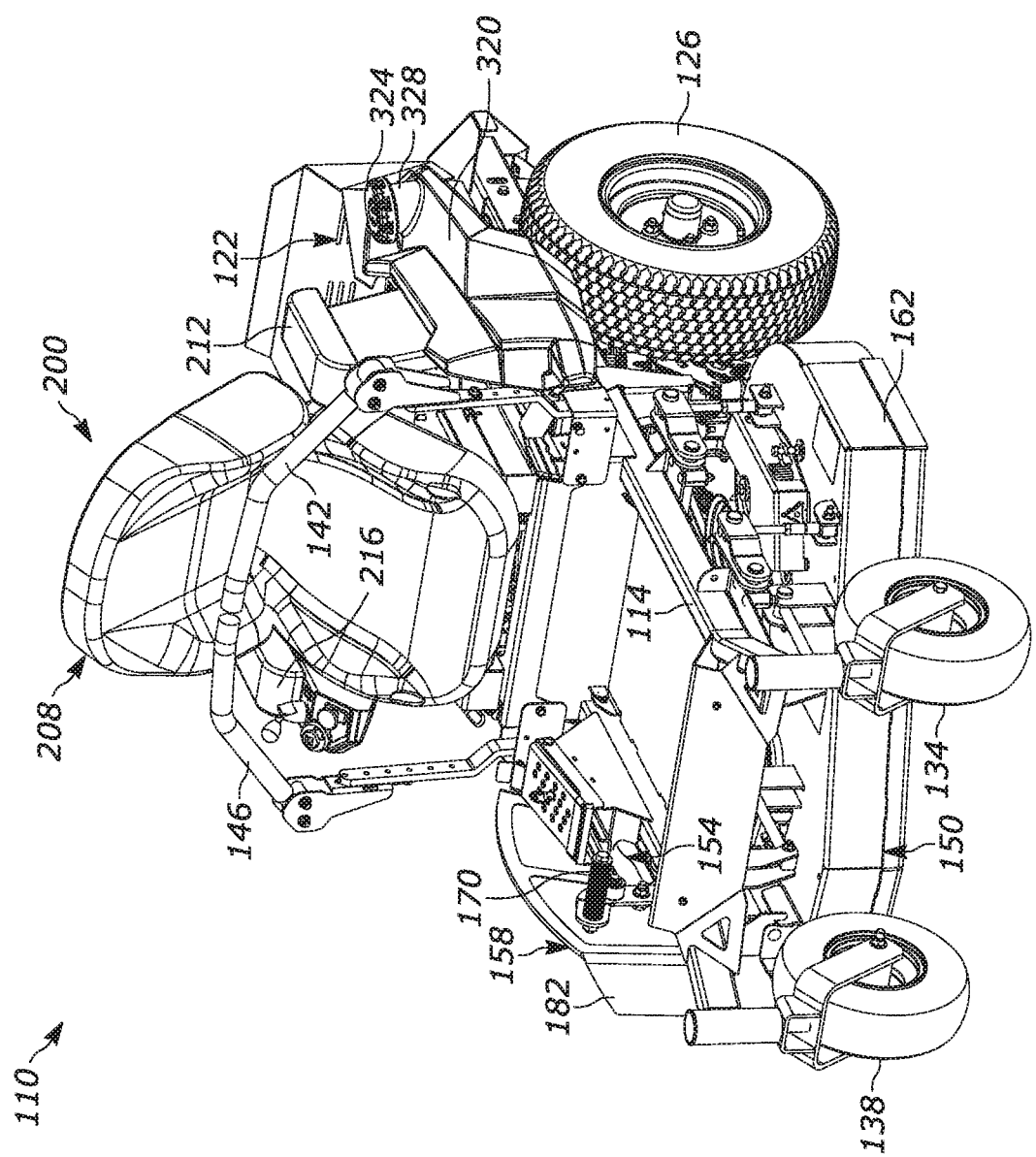
FIG. 3 is a perspective view of the lawn mower of FIG. 1, illustrating a seat of the seat assembly in a raised position.

As shown in FIGS. 1-3, the seat assembly 200 is coupled to the frame 114 and is positioned between the wheels 126, 130 and the passive wheels 134, 138. In the illustrated embodiment, the seat assembly 200 is disposed proximate, and is laterally centered between, the wheels 126, 130. In other words, the seat assembly 200 is disposed approximately an equal distance from each of the wheels 126, 130. The control arms 142, 146 are positioned on either side of the seat assembly 200 and each control arm 142, 146 is spaced an equal distance from the wheels 126, 130. The control arms 142, 146 are moveable away from the seat assembly 200 and toward the passive wheels 134, 138.

Figure 4:
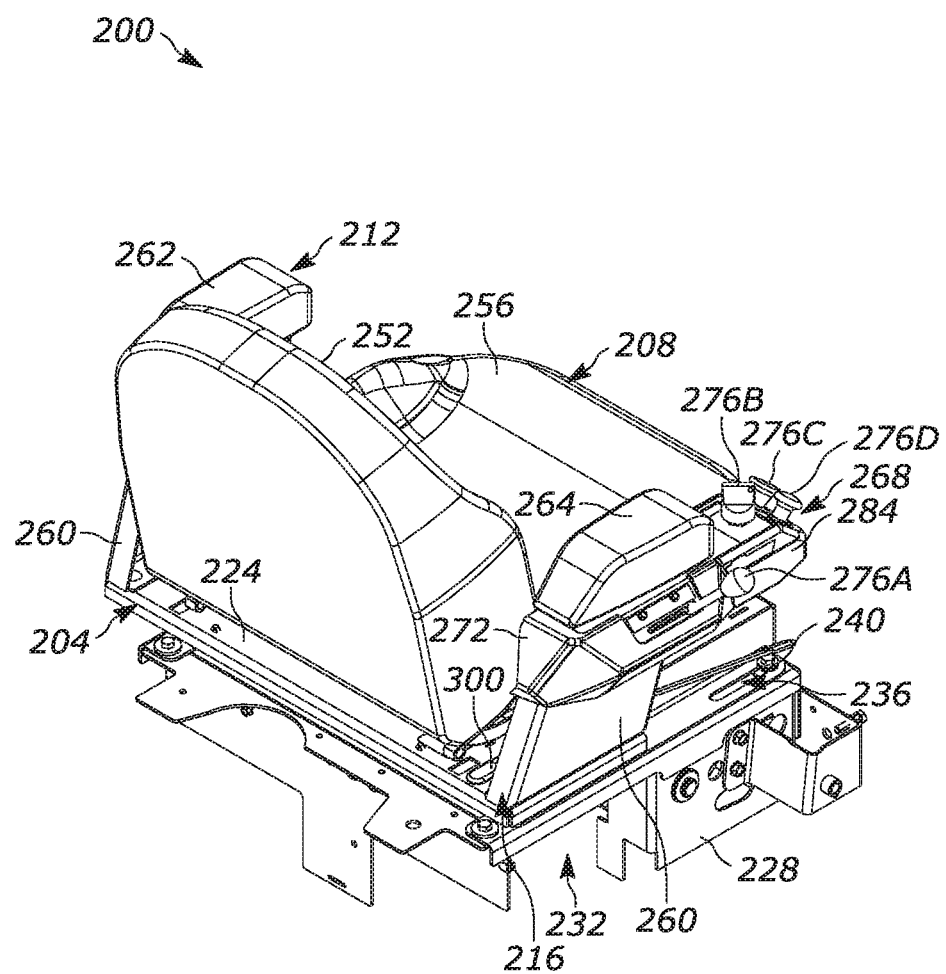
FIG. 4 is a rear perspective view of the seat assembly.

In the illustrated embodiment, the seat assembly 200 is the tallest point on the lawn mower 110. As shown in FIG. 4, a housing 228 is disposed beneath the seat assembly 200 to position the seat assembly 200 above the frame 114. The housing 228 is coupled to the seat assembly 200 and is part of the weldment of the frame 114. In the illustrated embodiment, the housing 228 is substantially rectangular in shape and is defined around a perimeter of the seat assembly 200. The housing 228 also includes an aperture 232 (FIG. 4) that provides communication between an external environment and a volume of space within the housing 228.

Figure 5:
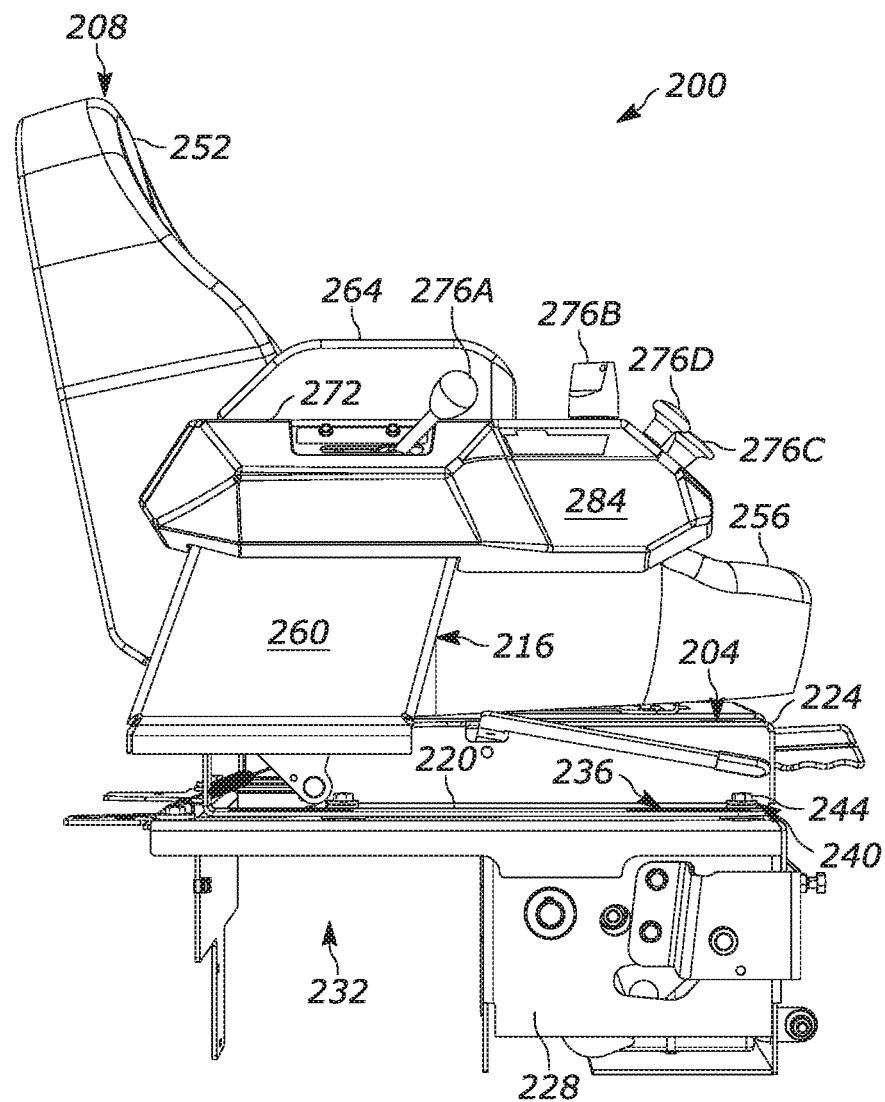
FIG. 5 is a side view of the seat assembly of FIG. 4.
Figure 6:
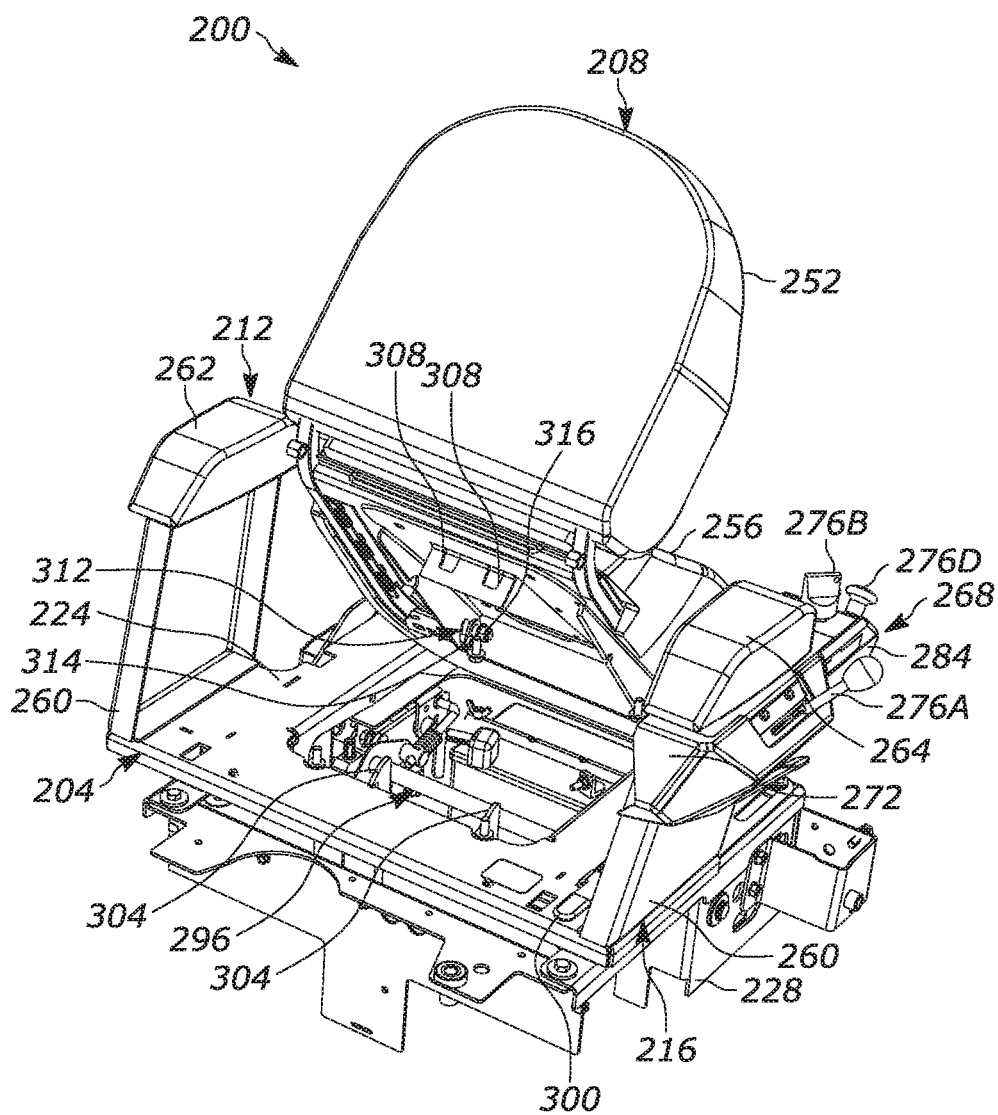
FIG. 6 is a rear perspective view of the seat assembly of FIG. 4 with the seat in the raised position.
Figure 7:
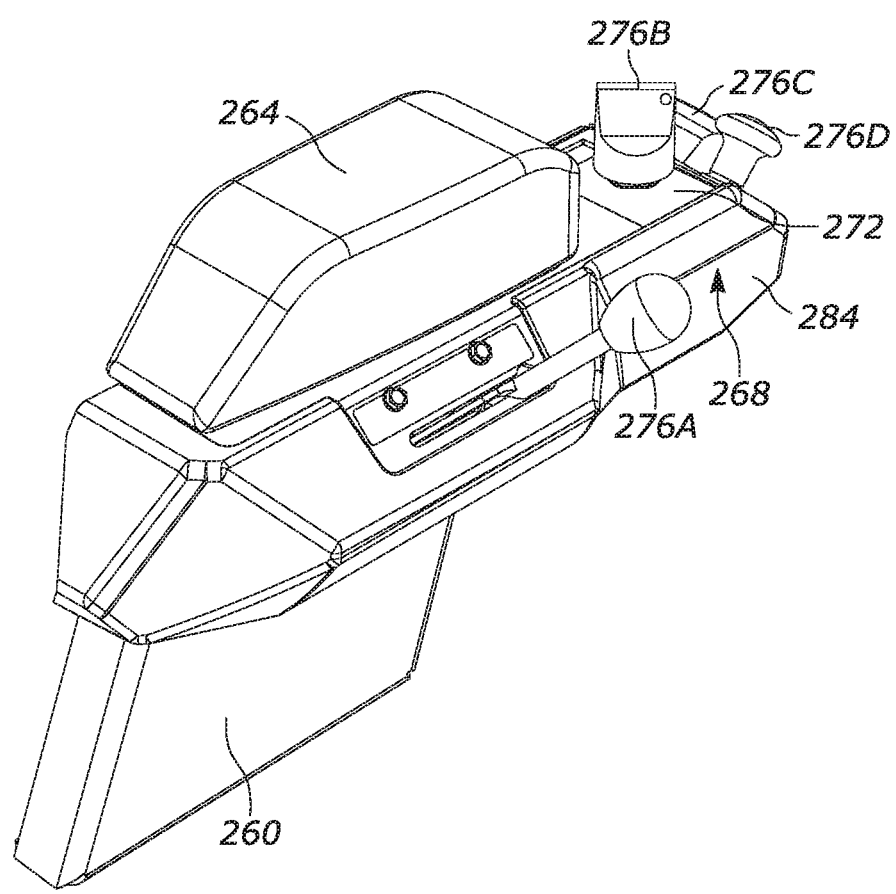
FIG. 7 is a perspective view of an armrest of the seat assembly.
Figure 8:
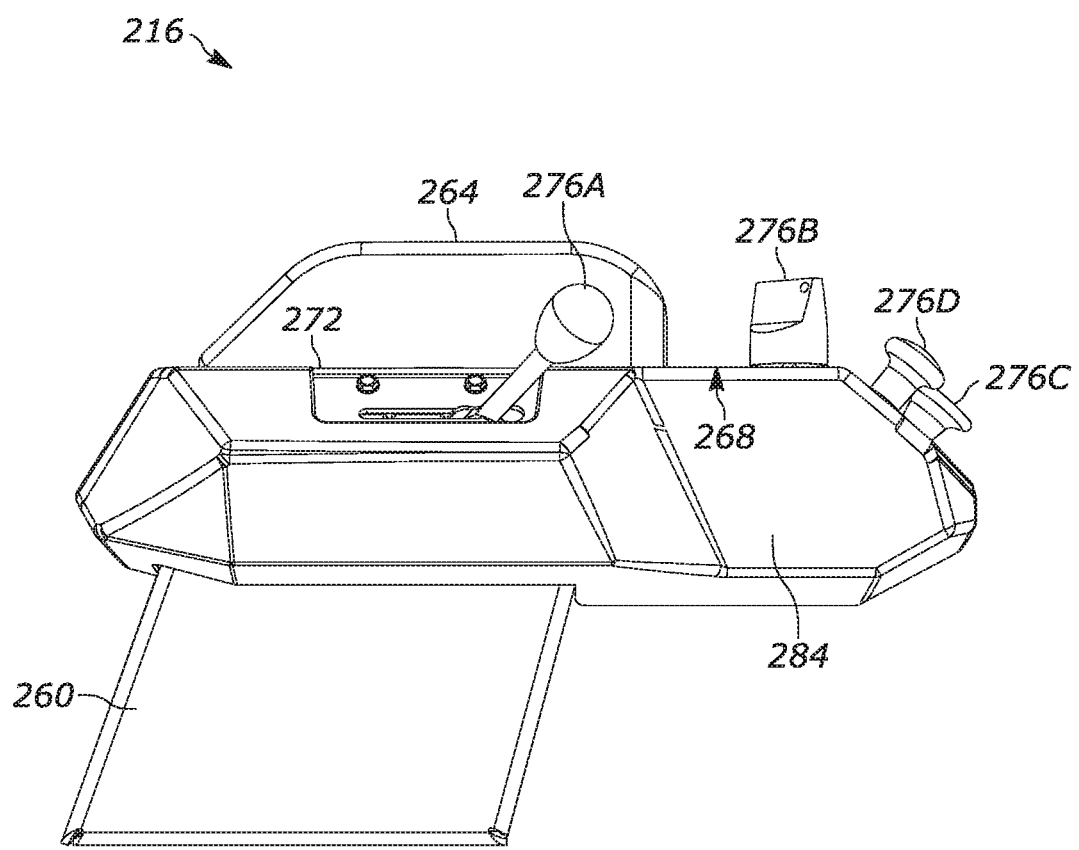
FIG. 8 is a side view of the armrest of FIG. 7.

FIGS. 4-6 illustrate the seat assembly 200 that includes a seat plate 204, an operator's seat 208, a first armrest 212, and a second armrest 216. The seat plate 204 is a rigid member and is substantially rectangular in shape. The seat plate 204 has a first surface 220 positioned proximate the frame 114 and a second surface 224 opposite the first surface 220. The first surface 220 is coupled to a housing 228 by fasteners (not shown). In the illustrated embodiment, walls of the housing 228 are positioned proximate outer edges of the seat plate 204.

The seat plate 204 includes an elongated slot 236 and a fastener 240 is received within the slot 236 and extends between the seat plate 204 and the housing 228. The fastener 240 is loosely coupled between the seat plate 204 and the housing 228. In other words, the fastener 240 does not clamp the seat plate 204 to the housing 228. In the illustrated embodiment, the fastener 240 includes a head 244 (FIG. 5) that is wider than a width of the elongated slot 236. The fastener 240 also includes a body (not shown) that is narrower than the width of the elongated slot 236. The loosely coupled fastener 240 is able to translate along a length of the elongated slot 236.

The operator's seat 208 is coupled to the second surface 224 of the seat plate 204. In the illustrated embodiment, the operator's seat 208 is centered on the seat plate 204 so that an operator seated in the operator's seat is approximately equidistant from each of the wheels 126, 130. In the illustrated embodiment, the operator's seat 208 is made from a cushioned material and is covered with leather, artificial leather, fabric, or other suitable materials. In other embodiments, the operator's seat 208 may be made from a rigid material like plastic.

The operator's seat 208 includes a back 252 and a base 256. Each of the back 252 and the base 256 includes curves and contours. The curves and contours approximately match a typical operator of the lawn mower 110. Thus, the curves and contours provide ergonomic support for an operator seated in the operator's seat 208.

The first armrest 212 and the second armrest 216 are coupled to the seat plate 204 and are disposed on either side of the operator's seat 208. In the illustrated embodiment, each armrest 212, 216 is disposed approximately an equal distance between the wheels 126, 130 and the operator's seat 208 (FIGS. 1-3). While seated in the operator's seat 208, the first armrest 212 is disposed on the operator's left and the second armrest 216 is disposed on the operator's right (FIG. 1). In the illustrated embodiment, the opening 172 and the discharge chute 182 are also disposed on the operator's right; while an ingress/egress for the operator's seat 208 is disposed on the operator's left. Thus, the first armrest 212 is disposed proximate the ingress/egress and the second armrest 216 is disposed proximate the opening 172 and discharge chute 182.

Each armrest 212, 216 includes a support structure 260. The support structure 260 is made from a rigid material like metal or hard plastic. In the illustrated embodiment, each support structure 260 is disposed at a corner of the seat plate 204 proximate the prime mover 122 (FIG. 1) and has a parallelogram shaped profile. Sides of the support structures 260 are inclined toward the passive wheels 134, 138. In other words, tops of the support structures 260 are located closer to a front of the operator's seat 208 than bottoms of the support structures 260.

FIGS. 7-10 illustrate the second armrest 216, which includes a support surface 264. The support surface 264 is disposed along the support structure 260 and extends above the top of the support structure 260. In the illustrated embodiment, the support surface 264 is made from a cushioned material and is covered with leather, artificial leather, fabric, or other suitable materials. In other embodiments, the support surface 264 may be made from a rigid material like plastic. The support surface 264 is wider than the support structure 260 and has a width approximately equal to a width of a typical user's arm. Thus, a user's arm may rest comfortably on the support surface 264. The first armrest 212 includes a substantially similar support surface 262 (FIGS. 1-3).

The second armrest 216 also includes a control panel 268 defined by a control plate 272 and controls 276. The control panel 268 is disposed between the top support structure 260 and the support surface 264. In the illustrated embodiment, the control plate 272 is in direct contact with the top of the support structure 260 and the support surface 264.

Figure 9:
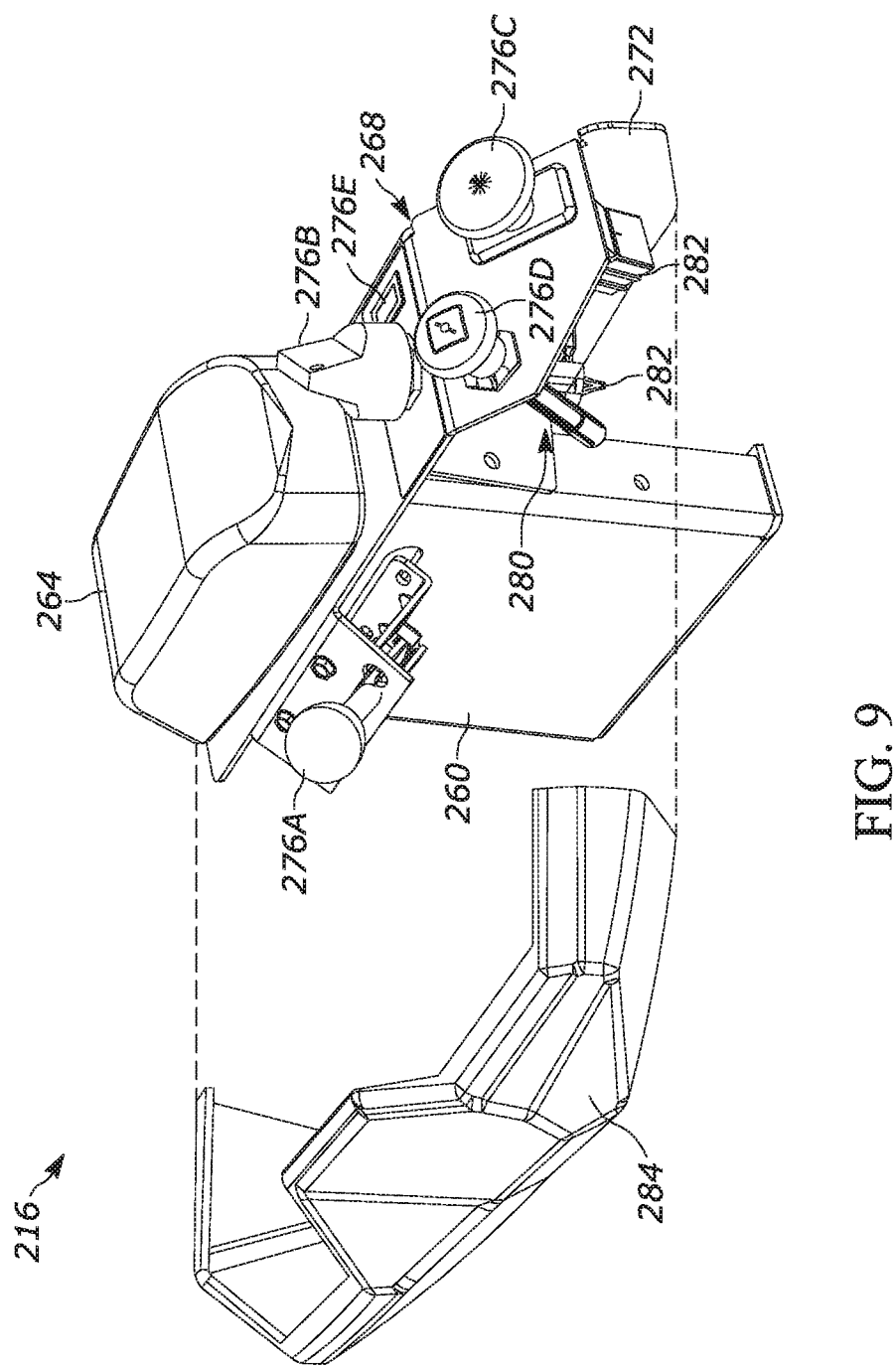
FIG. 9 is an exploded view of the armrest of FIG. 7, illustrating a control cavity.

The control plate 272 extends beyond the widths of the support structure 260 and the support surface 264. The controls 276 extend from an area of the control plate 272 beyond the support structure 260 and the support surface 264. The controls 276 extend toward the top of the support surface 264. In the illustrated embodiment, the controls 276 do not extend past the top of the support surface 264 (FIG. 8); although in other embodiments, the controls 276 may extend past the top of the support surface 264. In the illustrated embodiment, all controls 276 of the lawn mower aside from the control arms 142, 146 are disposed on the control plate 272. These controls may include a throttle control 276a, an ignition control 276b, a choke 276c, a power take off (PTO) control 276d, and an indicator 276e (FIG. 9). The indicator 276e may be an oil pressure light or an accessory indicator (e.g., an indicator to alert a user to an on/off state of headlights).

FIG. 9 shows a cavity 280 within the control plate 272. The controls 276 extend through the control plate 272 and into the cavity 280. Electrical components 282 (e.g., wiring, controllers, etc.) are disposed within the cavity 280 and electrically connected to the controls 276. The electrical components 282 are configured to transmit electrical signals to associated components of the lawn mower 110 based on actuation of the individual controls 276.

A cover 284 is removably coupled to the second armrest 216 to selectively enclose the cavity 280. In the illustrated embodiment, the control plate 272 has a shape complementary to a shape of the cover 284. The complementary shapes of the control plate 272 and the cover 284 allow the control plate 272 and the cover 284 to mate, thereby enclosing the cavity 280. The cover 284 is made from a rigid material (e.g., metal or hard plastic) to protect the electrical components 282 within the cavity 280 while the cover 284 is coupled to the control plate 272. In some embodiments, a seamless transition may be included between the control plate 272 and the cover 284.

Figure 10:
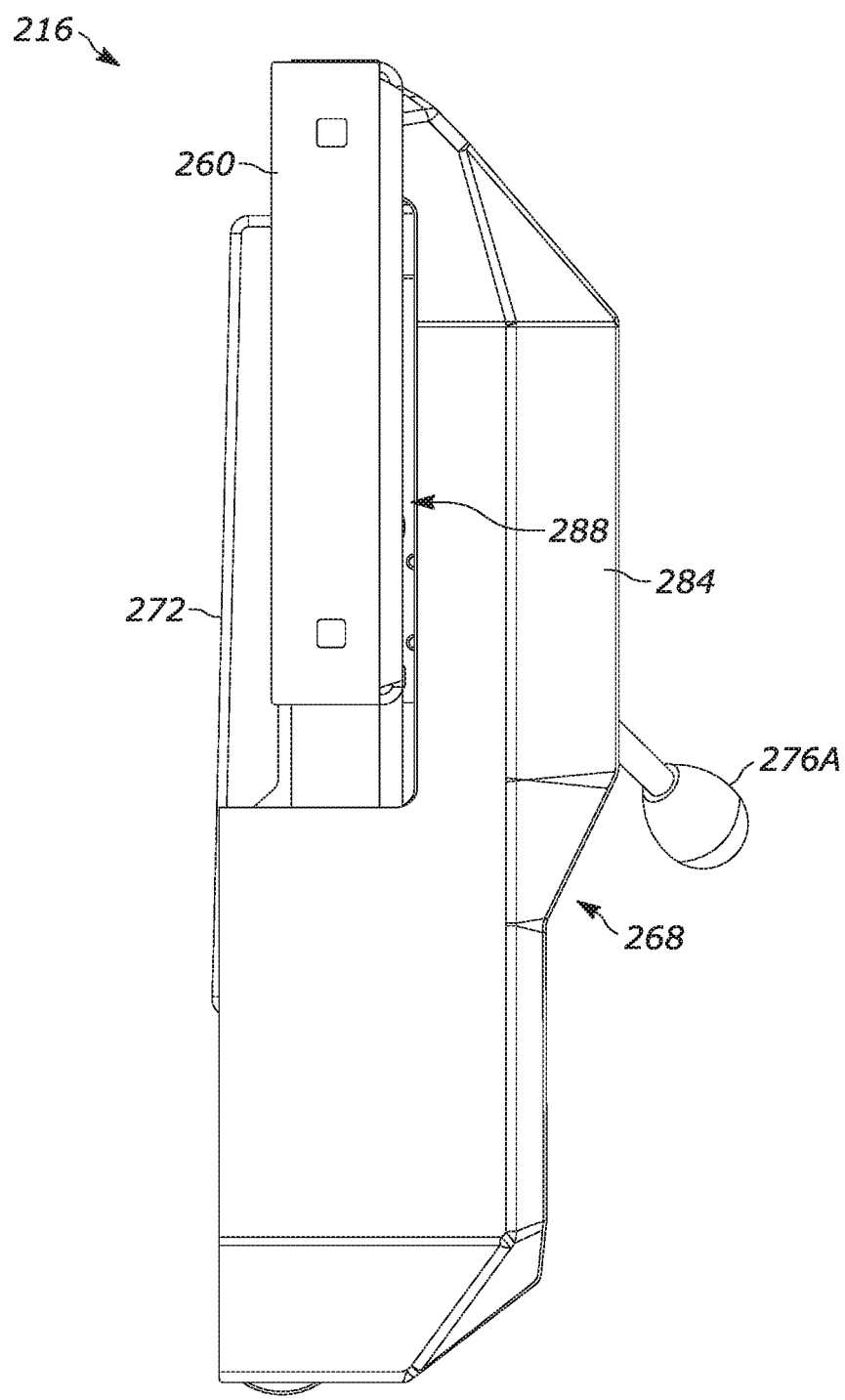
FIG. 10 is a bottom view of the armrest of FIG. 7, illustrating an aperture providing fluid communication between the control cavity and an external environment.

As shown in FIG. 10, a gap 288 is disposed between the cover 284 and the support structure 260. The gap 288 provides fluid communication between the cavity 280 and the external environment while the cover 284 is coupled to the control plate 272. In other embodiments, the cover 284 may include apertures that provide fluid communication between the cavity 280 and the external environment while the cover 284 is coupled to the control plate 272.

As shown in FIG. 1-3, a fuel tank 320 is disposed on the lawn mower 110 proximate the prime mover 122. In the illustrated embodiment, the fuel tank 320 extends around a portion of a perimeter of the seat assembly 200 between the first armrest 212 and the second armrest 216. In other words, the fuel tank 320 is substantially U-shaped. The fuel tank 320 is also spaced apart from the seat assembly 200 so that the controls 276 are spaced apart from the fuel tank 320. The positioning of the fuel tank 320 disposes a center of gravity closer to the ground and the U-shape centralizes the center of gravity with respect to the lawn mowers' 110 overall center of gravity, which may allow for easier maneuverability of the lawn mower 110. The fuel tank 320 may also include air ducts (not shown) to assist in cooling transaxles (not shown) of the lawn mower 110. The fuel tank shape gives the fuel tank 320 a large fuel capacity and assists in cooling a lawn mower transmission (not shown) by helping to direct air across the transmission. The shape of the fuel tank 320 also provides ample surface area to include a logo or other stylistic mark. The fuel tank 320 does not extend beyond the wheels 126, 130 on either side of the lawn mower 110.

The fuel tank 320 includes a fuel cap 324 selectively covering an associated fuel inlet 328 (FIG. 3). In the illustrated embodiment, the fuel inlet 328 is disposed proximate the first armrest 212, and on an opposite side of the lawn mower 110 than an exhaust outlet 330. Said another way, the fuel inlet 328 is disposed on an operator's left and is on an opposite side of the lawn mower 110 than the discharge opening 172. As such, an operator is not near the exhaust outlet 330 when filling the fuel tank 320. The fuel tank 320 includes a single internal cavity (not shown) in fluid communication with the fuel inlet 328. The internal cavity extends substantially throughout an entire volume of the fuel tank 320 so that the fuel inlet 328 provides fluid communication to the whole fuel tank 320.

A user may remove the fuel cap 324 and insert a fluid (e.g., gasoline) into the internal cavity in order to fill the fuel tank 320. The fluid enters the internal cavity and spreads out around the entire volume. Once the internal cavity is filled (or when the operator decides the internal cavity is sufficiently filled), the operator may recouple the fuel cap 324 to the fuel tank 320 so that the fuel cap 324 covers the fuel inlet 328.

The single fluid inlet 328 allows an operator to efficiently fill the fuel tank 320 because the operator is not required to walk around to another side of the lawn mower 110 to fill a separate fuel tank. A single fuel tank 320 also means that the lawn mower 110 does not need duplicates of other fuel tank components (e.g., a fuel gauge, a fuel pick up, etc.—not shown); although the lawn mower 110 may still include duplicates. The single fuel tank 320 also requires fewer fastening members to couple the fuel tank 320 to the lawn mower 110 as compared to multiple fuel tanks. The fuel tank 320 with a single fuel pick up has increased fuel capacity and increased fill efficiency, which thereby makes the lawn mower 110 more efficient.

Figure 11:
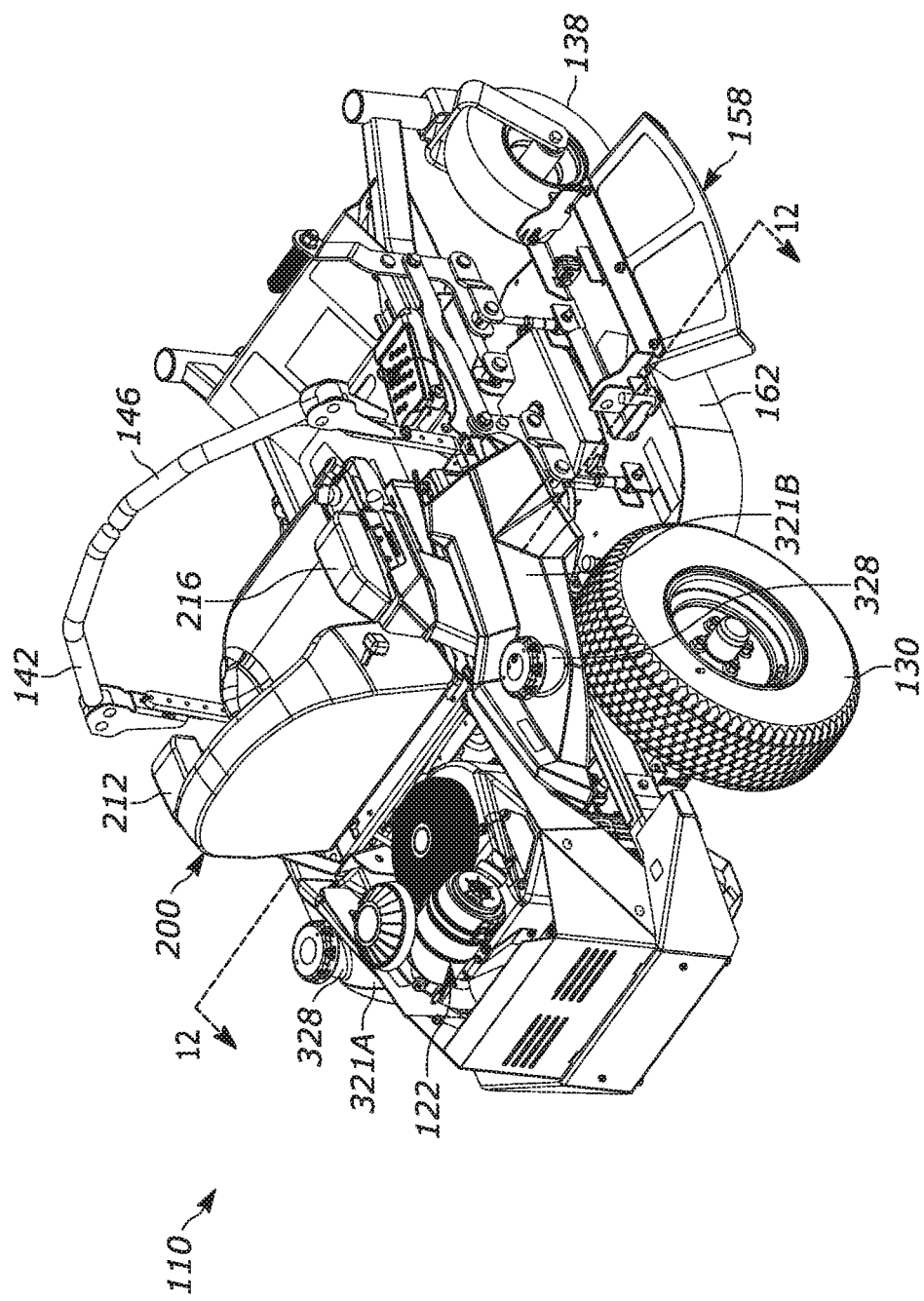
FIG. 11 is a perspective view of a lawn mower according to another embodiment.

As shown in FIG. 11, other embodiments of the lawn mower 110 may include multiple fuel tanks 321a, 321b. Each fuel tank 321a, 321b extends around a portion of a perimeter of the seat assembly 200. In the illustrated embodiment, each fuel tank 321a, 321b extends along one arm rest 212, 216 and toward the prime mover 122. The fuel tanks 321a, 321b are independent from one another and each fuel tank 321a, 321b includes a fuel inlet 328. Each fuel tank 321a, 321b is filled independently of the other fuel tank 321a, 321b.

Figure 12:
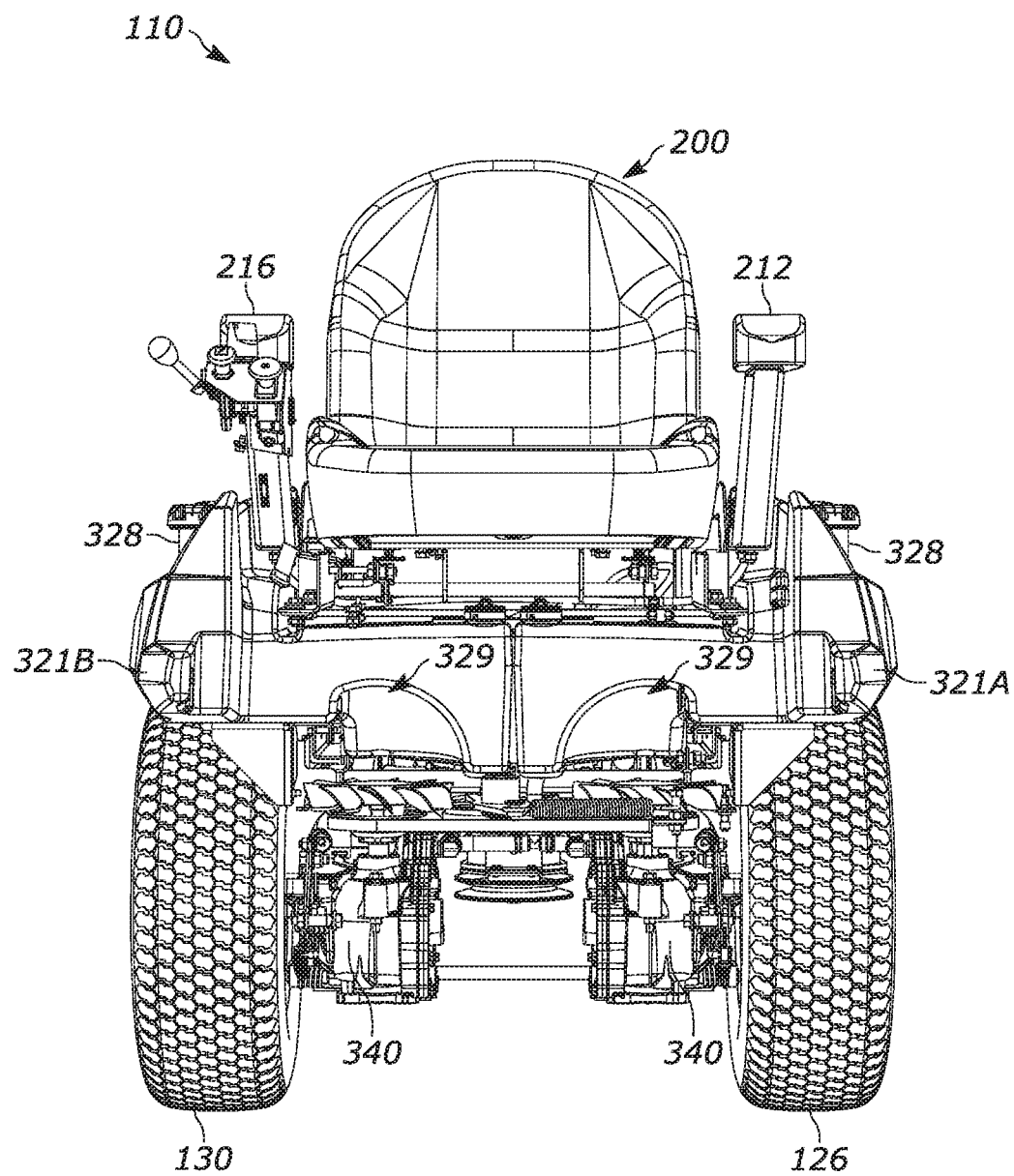
FIG. 12 is a cross-sectional view of the lawn mower of FIG. 11, viewed along section 12-12.
Figure 13:
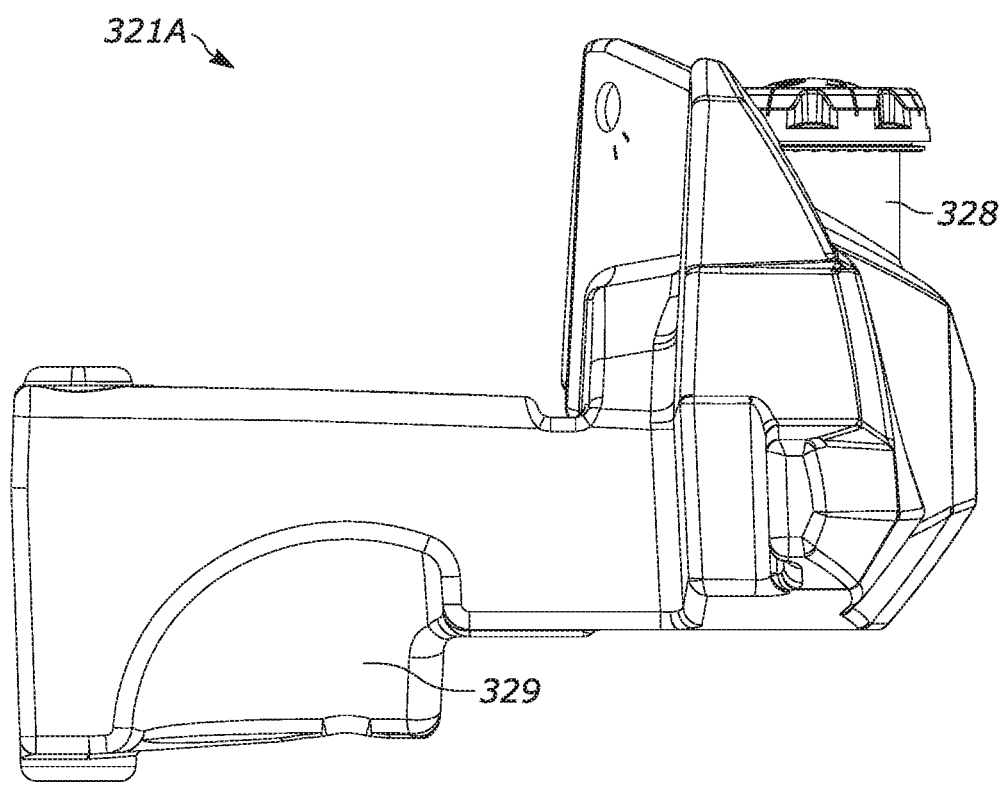
FIG. 13 is a front view of a fuel tank of the lawn mower of FIG. 11.

As shown in FIGS. 12 and 13, each fuel tank 321a, 321b at least partially defines an air duct 329. In the illustrated embodiment, the air ducts 329 are formed on the respective fuel tanks 321a, 321b, and are directed toward the ground. The air ducts 329 direct airflow toward transaxles 340 in order to facilitate cooling the transaxles 340 of the lawn mower 110.

Returning to FIGS. 1-3, a user may sit on the operator's seat 208 of the seat assembly in order to operate the lawn mower 110. Before starting the lawn mower 110, the user may adjust the position of the operator's seat 208 relative to the control arms 142, 146. The fastener 240 and the elongated slot 236 allow the seat plate 204 to translate relative to the housing 228 and, therefore, the frame 114. A shorter user may translate the seat plate 204 toward the passive wheels 134, 138 so the seat assembly 200 is closer to the control arms 142, 146, as shown in FIG. 2. A taller user may translate the seat plate 204 away from the passive wheels 134, 138 and toward the wheels 126, 130 so that the seat assembly is further from the control arms 142, 146, as shown in FIG. 1. The first armrest 212, the second armrest 216, which includes the controls 276, and the operator's seat 208 are fixed relative to the seat plate 204 for translational movement along a length of the lawn mower 110. In other words, the seat plate 204, the operator's seat 208, the armrests 212, 216, and the controls 276 translate together between the wheels 126, 130 and the passive wheels 142, 146. Thus, the armrests 212, 216 and the controls 276 are always in a same position relative to the operator's seat 208. No matter where the seat plate 204 is positioned, an operator will be able to use the armrests 212, 216 and the controls 276 because they are always positioned the same relative to the operator's seat 208. The armrests 212, 216 and the controls 276 are positioned relative to the operator's seat 208 so that users with longer arms and users with shorter arms are able to comfortably use the armrests 212, 216 and the controls 276.

As shown in FIGS. 4-6, any height user may position their arms on the support surfaces 264 of the armrests 212, 216 while seated in the operator's seat 208 because the armrests 212, 216 do not move relative to the operator's seat 208. Since the controls 276 extend above the control plate 272 in the direction of the support surface 264, a user's arm positioned on the support surface 264 is capable of actuating any of the controls 276. The inclination of the support structure 260 disposes the controls 276 in a natural position of a user to reach while his/her arm is positioned on the support surface 264. This means that the controls 276 are disposed proximate an operator's fingertips while the operator's arm is positioned on the support surface. Thus, minimal movement of an operator's arm is required in order to reach and actuate the controls 276.

The controls 276 extending toward the support surface 264 also allow a user to see the controls 276 while seated in the operator's seat 208. The controls 276 are positioned around the control panel 272 on different sides of the support surface 264. The height of the controls 276 allows a user to visually inspect the different controls 276 without needing to look around the support surface 264. In other words, the controls 276 are all easily visible to a user seated in the seat 208. The fixed position of the controls 276 relative to the user positioned in the seat 208 allows the user to consistently know the positioning of each of the controls 276. The fixed position of the controls 276 also allows a user to feel for individual controls 276 without looking at the controls 276. This helps a user quickly find and actuate the proper control 276 without taking their eyes off of the direction of travel.

The fuel tank 320 does not substantially obstruct an operator's view around the lawn mower 110 while the operator is seated in the operator's seat. By not extending beyond the wheels 126, 130, the fuel tank 320 does not substantially block an operator from viewing the ground proximate the wheels 126, 130, enabling the user to see a trim edge (i.e., an edge of a cutting area) and an area around the cutting deck pan 162 and avoid material that the user does not want the blades 166 to contact. Additionally, the controls 276, positioned on the operator's right, do not interfere with an operator's line of sight to the trim edge, positioned on the operator's left (e.g., opposite the discharge chute assembly 158). The narrow profile of the fuel tank 320 also allows the operator to see material exiting the opening 172, so that the user may observe where the cut material is being discharged.

While operating the lawn mower 110, debris (e.g., dirt, cut vegetation, etc.) travels through the external environment around the lawn mower 110. Some of this debris may settle within the cavity 280. This debris may disrupt the electric connections between the controls 276 and their associated components. This is especially true if debris containing moisture, or if liquids (e.g., precipitation), enters the cavity 280. The gap 288 provides debris, or moisture, that has entered the cavity 280 an exit to return to the external environment. Gravity helps to facilitate the movement of the debris out of the cavity 280 and through the gap 288 so that the debris can return to the external environment.

Some debris may be too large to pass through the gap 288, or the debris may get stuck in the cavity 280 and is unable to exit the gap 288 simply by of the influence of gravity. To remove the stuck debris, the user may remove the cover 284 from the control plate 272 so that the cover 284 no longer selectively covers the cavity 280 (FIG. 9). The user may then remove any trapped debris and dry any moisture remaining within the cavity 280. The cover 284 is then recoupled to the control plate 272 to recover the cavity 280.

The electrical components and a starter for the prime mover 122 may be battery powered. In the illustrated embodiment, a battery 292 (FIG. 6) is disposed in the housing 228 between the seat assembly 200 and the frame 114. When the battery 292 dies, a user may wish to access the battery 292 in order to replace the battery 292 with a new, operational battery.

Returning to FIG. 6, the seat plate 204 includes an aperture 296 that provides fluid communication between the volume of space within the housing 228 (i.e., where the battery 292 is stored) and the external environment. The operator's seat 208 selectively covers the aperture 296 and is pivotable between a first or closed position (FIG. 4) and a second or open position (FIGS. 3 and 6).

The closed position is also an operating position. As shown in FIGS. 1 and 2, the base 256 of the operator's seat 208 is substantially parallel with the seat plate 204. An operator may position their body on the operator's seat 208 and operate the lawn mower 110.

The opened position (FIG. 3) discourages operation of the lawn mower 110. The base 256 of the operator's seat 208 is raised to an oblique angle with respect to the seat plate 204 so that a potential user cannot position themselves on the seat in a comfortable manner and operate the lawn mower 110. In the illustrated embodiment, the operator's seat 208 cannot support the weight of an operator in the opened position. If an operator attempted to sit on the operator's seat 208 in the opened position, the weight of the operator would cause the operator's seat 208 to return to the closed position.

As shown in FIG. 6, a latch 300 is coupled to the seat plate 204 to selectively unlock the operator's seat 208 in order to allow movement of the operator's seat 208. In the illustrated embodiment, the latch 300 is positioned proximate the second armrest 216 and is biased toward from the seat plate 204. The latch 300 couples to two projections 304 which are receivable within apertures 308 on the operator's seat 208. In the closed position, the apertures 308 of the operator's seat 208 are positioned proximate the second surface 224 of the seat plate 204 and the projections 304 are received within the apertures 308. The projections 304 coupled to the apertures 308 prevent relative movement between the seat plate 204 and the operator's seat 208.

A user may actuate the latch 300 by providing a force to the latch 300 directed away from the seat plate 204. This force causes the projections 304 to move out of the apertures 308 so that the operator's seat 208 is no longer fixed relative to the seat plate 204. While the latch 300 remains actuated, a user may pivot the operator's seat 208 in the direction of the passive wheels 134, 138 (i.e., clockwise as viewed in FIG. 6). The operator's seat 208 includes two arcuate slots 312 (only one shown) positioned on either side of the operator's seat 208 on an inner surface. Rods 314 (only one shown) are fixed to the seat plate 204 and extend into each of the arcuate slots 312. Fastening members 316 (only one shown) are positioned on either side of the operator's seat 208 and loosely coupled between the operator's seat 208 and the seat plate 204. The fastening members 316 allow the operator's seat 208 to pivot relative to the seat plate 204. The arcuate slots 312 moves along the respective rods 314 as the operator's seat pivots. The rods 314 act as stop surfaces for the operator's seat 208 as it pivots relative to the seat plate 204. In the illustrated embodiment, the rod 314 allows the operator's seat 208 to pivot between zero and ninety degrees.

While the operator's seat 208 is in the open position, a user may reach various components of the lawn mower 110 in order to perform maintenance and service. For example, the user may reach the battery 292 in order to remove the battery 292 and replace the battery 292. The user may also access and perform service on a control and brake linkage, the fuel tank 320, a battery cable, dampers, steering controls, and eccentrics for the brakes. The user may then lower the operator's seat 208 so that it returns to the lowered position. The projections 304 then reengage with the apertures 308 so that the operator's seat 208 is once again fixed relative to the seat plate 204.

Each armrest 212, 216 is fixed to the seat plate 204 and does not pivot with the operator's seat 208 between the opened and closed positions. In the illustrated embodiment, the armrests 212, 216 cannot move in any direction relative to the seat plate 204. In other embodiments, a height of the armrests 212, 216 may be adjustable (e.g., the armrests 212, 216 may be moveable in a vertical direction relative to the operator's seat 208).

Although the above description is with reference to a lawn mower, it should be understood that aspects of the invention are also applicable to other types of utility machines, such as tractors, snow throwers, utility task vehicles (UTV's), and the like.

Various features and advantages of the invention are set forth in the following claims.

What is claimed is:

1. A lawn mower comprising:
   a frame;
   a prime mover supported by the frame;
   a plurality of ground-engaging elements coupled to the frame and driven by the prime mover to propel the lawn mower;
   a cutting deck pan supported by the frame;
   a cutting blade mounted below the cutting deck pan to cut vegetation under the cutting deck pan;
   a seat plate movably coupled to the frame;
   an operator seat coupled to the seat plate and configured to support the weight of an operator; and
   an armrest laterally spaced from the operator seat, the armrest including
      an elongated support having a first end fixed to the seat plate and a second end,
      an arm support surface coupled to the second end of the elongated support and configured to support a user's arm, and
      a control panel coupled to the elongated support at a vertical height between the arm support surface and the first end of the elongated support, the control panel fixed to the elongated support for movement with the seat plate such that the control panel remains stationary relative to the seat plate during movement relative to the frame, the control panel including an actuator to control a function of the lawn mower, the actuator configured to be actuated while the user's arm is on the support surface, wherein the operator seat is movable relative to the seat plate and the armrest.

2. The lawn mower of claim 1, wherein the seat plate, the armrest, and the operator seat are fixed relative to one another for translational movement relative to the frame.

3. The lawn mower of claim 1, wherein the cutting deck pan defines a discharge opening disposed on a side of the cutting deck pan, and wherein the armrest is disposed on a side of the seat plate proximate the discharge opening so that the armrest and the opening are disposed on a same lateral side of the lawn mower.

4. The lawn mower of claim 1, wherein the seat plate includes an aperture, wherein a control and brake linkage is disposed beneath the seat plate proximate the aperture, and wherein the operator seat selectively covers the aperture and is pivotable relative to the seat plate to allow access to the control and brake linkage.

5. The lawn mower of claim 1, further comprising a tank including an inlet configured to store a fluid necessary to power the prime mover, wherein the tank is disposed at least partially around the operator seat, and wherein the inlet is disposed on a side of the operator seat opposite the armrest and positioned at a vertical height between the first end of the elongated support and the arm support surface.

6. The lawn mower of claim 1, wherein the control panel includes a cavity configured to house wires electrically connected to the controls, and a cover selectively enclosing at least a portion of the cavity, wherein an aperture provides fluid communication between the cavity and an external environment while the cover selectively encloses the cavity.

7. The lawn mower of claim 1, wherein the control panel includes multiple actuators, wherein all of the actuators are disposed on the control panel and actuatable while the user's arm is on the arm support surface.

8. The lawn mower of claim 1, wherein the actuator is one selected from the group consisting of a power take off control, a prime mover ignition control, a throttle control, and a choke.

9. A utility machine comprising:
a frame having a front end and a rear end;
a prime mover supported by the frame;
first ground-engaging elements coupled to the frame adjacent the rear end and driven by the prime mover to propel the utility machine;
second ground-engaging elements coupled to the frame adjacent the front end;
a cutting deck pan supported by the frame, the cutting deck pan defining a discharge opening disposed on a side of the cutting deck pan between the first ground-engaging elements and the second ground-engaging elements;
a cutting blade mounted below the cutting deck pan to cut vegetation under the cutting deck pan, the cut vegetation configured to pass through the discharge opening; and a seat assembly including
a seat plate moveably coupled to the frame,
an elongated support fixed to the seat plate,
an operator seat coupled to the seat plate,
a first armrest fixed relative to the seat plate and disposed on a side of the seat plate opposite the discharge opening, and
a second armrest fixed relative to the seat plate and disposed on a side of the seat plate proximate the discharge opening, the second armrest including an arm support surface and a control plate supporting controls actuatable by a user, where the control plate is fixed to the seat plate by the elongated support, the controls being positioned around the arm support surface,
wherein the seat plate, the first armrest, the second armrest, and the operator seat are fixed relative to one another for translational movement relative to the frame, and
wherein the operator seat is pivotable relative to the first armrest, the second armrest, and the seat plate.

10. The utility machine of claim 9, further comprising a housing coupled between the seat plate and the frame, wherein the seat plate is translatable relative to the housing and the frame.

11. The utility machine of claim 9, wherein the control plate including a cavity disposed below the arm support surface, the cavity housing electrical components associated with the controls.

12. The utility machine of claim 11, wherein the seat assembly further includes a cover removably coupled to the control plate and selectively covering the cavity, wherein the cover defines an aperture between the cover and the second armrest to provide fluid communication between the cavity and an external environment while the cover is coupled to the control plate.

13. The utility machine of claim 9, wherein the seat plate includes an aperture, wherein at least one selected from a group consisting of a battery, a control and brake linkage, a battery cable, dampers, steering controls, and eccentrics for brakes are disposed beneath the seat plate proximate the aperture, and wherein the operator seat selectively covers the aperture and is pivotable relative to the seat plate to allow access to the at least one selected from the group consisting of the battery, the control and brake linkage, the battery cable, the dampers, the steering controls, and the eccentrics for brakes.

14. The utility machine of claim 9, wherein the controls include a power take off control, a prime mover ignition control, a throttle control, and a choke.

15. The utility machine of claim 9, further comprising a tank including an inlet configured to store a fluid necessary to power the prime mover, wherein the tank is disposed at least partially around the seat assembly, and wherein the inlet is disposed on a side of the operator seat proximate the first armrest and disposed at a vertical height between the frame and the arm support surface.

16. The utility machine of claim 9, wherein the controls are fixed relative to the arm support surface.

* * * * *